United States Patent

[11] 3,622,887

[72] Inventor Theodore A. Byles
Villa Park, Ill.
[21] Appl. No. 825,024
[22] Filed May 15, 1969
[45] Patented Nov. 23, 1971
[73] Assignee Motorola, Inc.
Franklin Park, Ill.

[54] OVERLOAD COMPENSATION CIRCUIT FOR ANTENNA TUNING SYSTEM
10 Claims, 4 Drawing Figs.

[52] U.S. Cl. .......... 325/362,
325/381, 325/383, 325/387, 325/411, 325/413
[51] Int. Cl. .......... H04b 1/18
[50] Field of Search .......... 325/362,
365, 373, 376, 381, 383, 387, 400, 411, 413

[56] References Cited

UNITED STATES PATENTS 3,029,339 4/1962 Pan .......... 325/381 X
3,490,046 1/1970 Russell .......... 325/411

*Primary Examiner*—Robert L. Richardson
*Assistant Examiner*—Kenneth W. Weinstein
*Attorney*—Mueller and Aichele

ABSTRACT: A radio receiver is supplied with signals from a high impedance capacitive antenna coupled in series with a low impedance resistive load in the form of the emitter-base circuit of a common-base RF transistor amplifier. The coupling circuit is a series tuned circuit having a varactor diode connected in series with an inductor between the antenna and the emitter of the RF transistor amplifier. Overload compensation for the varactor diode is provided by a variable resistor in the form of the collector-emitter path of a second transistor connected between the base of the RF amplifier transistor and ground. The base of the RF amplifier transistor is DC isolated from the collector of the second transistor, and automatic gain control voltage is applied to the base of the second transistor to vary its conductivity in accordance with variations in the signal strength.

Inventor
THEODORE A. BYLES
BY
Mueller, Aichele & Rauner
ATTYS.

Inventor
THEODORE A. BYLES
BY Mueller, Aichele & Rauner
ATTYS.

OVERLOAD COMPENSATION CIRCUIT FOR ANTENNA TUNING SYSTEM

BACKGROUND OF THE INVENTION

The use of voltage variable semiconductor diode capacitors for electronically tuning radio receivers has provided receiver designers with a wide latitude of design possibilities in the configurations which may be made in the receivers. Because the diode capacitors are voltage controlled devices, however, the characteristics of the capacitors respond to the level of the RF signals applied across them; so that partial rectification of strong signals sometimes occurs, causing a change in the DC bias on the diode. This then results in degradation of the circuit operation due to changes in the capacitance value of the reverse biased diode capacitor, and detuning of the circuit occurs.

This problem is especially severe in the antenna stage, so that it is desirable to provide a means of preventing high signal levels from being applied across the voltage-variable diode capacitors used in the antenna tuning stage of the receiver. When a series-tuned, series-connected coupling circuit is used to couple the signals from the antenna to the RF amplifier, it is desirable to provide a means for increasing the impedance in series with the diode capacitor for increasing signal levels, so that a smaller proportion of the AC signal voltage is applied across the diode. This can be accomplished by utilizing the AGC voltage of the receiver to vary the bias on the RF amplifier transistor; but since this type of control results in some operation of the transistor in nonlinear regions, it is desirable, for some applications, to provide a variable impedance which does not alter the DC operating level of the RF amplifier transistor.

SUMMARY OF THE INVENTION

It is an object of this invention to provide an overload compensation circuit for a voltage-variable reactance device used in an antenna tuning circuit.

It is an additional object of this invention to insert a signal level responsive variable impedance in series with a voltage-variable capacitance in an antenna tuning circuit in order to provide an overload compensation for the voltage-variable capacitor.

It is a further object of this invention to vary the impedance in series with the input circuit of an RF amplifier in response to changes in the magnitude of the wave signal obtained from an antenna in order to provide an overload compensation for a voltage-variable capacitor in the antenna tuning circuit.

An antenna tuning circuit including a voltage-variable reactance is connected in series between an antenna and the input of an RF amplifier stage. Overload compensation for the voltage-variable reactance is provided by a variable impedance connected in series with the input circuit of the RF amplifier device. The impedance is varied in response to a control voltage corresponding to the output of the RF amplifier stage to thereby vary the signal level appearing across the voltage variable reactance device in the tuning circuit.

DETAILED DESCRIPTION

Figure 1:
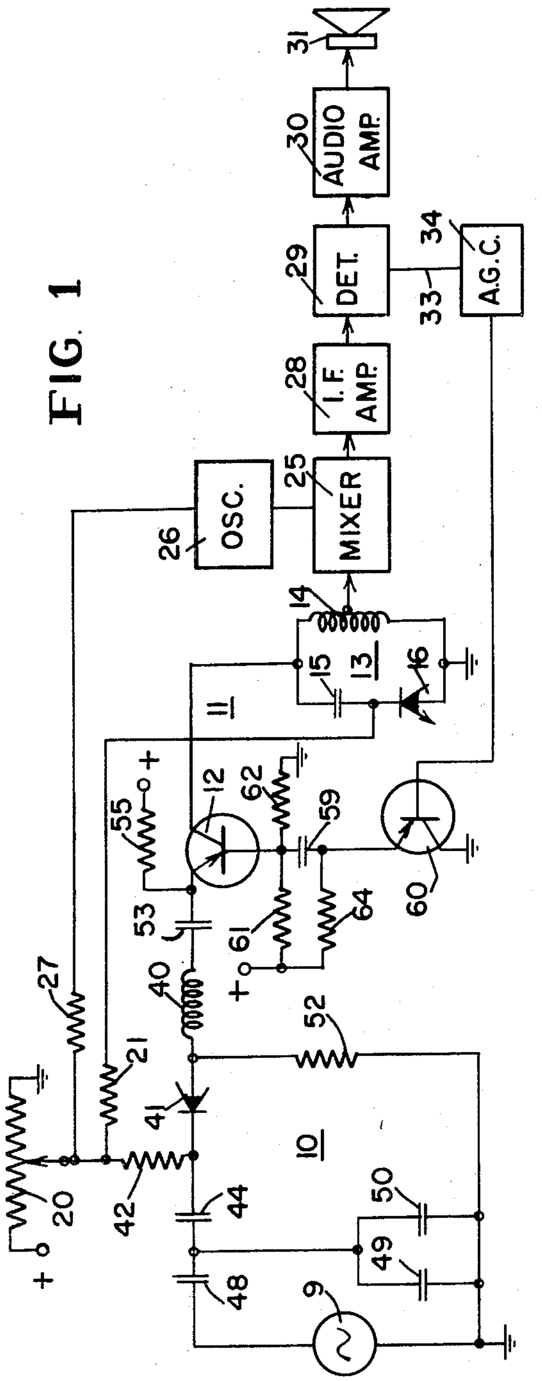
FIG. 1 is a schematic wiring diagram, partially in block form, illustrating a preferred embodiment of the invention.

Referring now to the drawing, in which like reference numbers are used in both figures to indicate like elements, there is shown an AM radio receiver circuit for receiving signals over an antenna 9, shown as a voltage generator and associated capacitance for a better understanding of the circuit, with the antenna being coupled through a series tuned L-C circuit 10 to the input of an RF amplifier stage 11 including a common-base PNP transistor 12. The signals from the coupling circuit 10 are applied across the RF amplifier input circuit in the form of the emitter-base path of the transistor 12 which has a tuned circuit 13 connected to its collector. The tuned circuit 13 consists of a tapped coil 14 with a blocking capacitor 15 and a voltage-variable tuning capacitor 16 connected in series across the coil 14. The voltage variable capacitor 16 and the coil 14 from the resonant circuit for the RF amplifier transistor 12, and this circuit is tuned over a predetermined frequency range.

The voltage-variable capacitor 16 is a two-terminal PN junction semiconductor device which exhibits a change in capacitance proportional to a change in the direct current reverse bias across the device. Voltage-variable capacitors or reactive devices of this type are well known, and an increase in the reverse bias voltage across such a capacitor causes its capacitance to decrease, thereby increasing the capacitive reactance. A decreased reverse bias results in the opposite effect, that is, the capacitance of the device increases and the capacitive reactance decreases. Devices which preferably may be used for the voltage-variable capacitor 16 are hyper-abrupt varactor diodes since the hyper-abrupt diodes exhibit great capacitance changes in response to the biasing voltage and thus are operable over a wide frequency range.

The biasing potential or tuning voltage for the voltage variable capacitor 16 is obtained from the tap of a potentiometer 20 and is applied through an isolating resistor 21 to the junction between the voltage-variable capacitor 16 and the blocking capacitor 15. The potentiometer 20 may be located in the radio receiver itself or at a remote location and provides direct current potentials of varying amounts.

The selected radio frequency signal obtained from the tap on the coil 14 of the tank circuit 13 is applied to one input of a mixer 25, the other input of which receives signals from a local oscillator 26, which also may include a tuning circuit or tank circuit having a voltage variable capacitor similar to the capacitor 16. The frequency of the oscillator tank circuit also may be controlled by the biasing potential obtained from the potentiometer 20 and applied through a coupling resistor 27 to the oscillator 26. The amplified RF signals are heterodyned with the local oscillator signals from the oscillator 26 by the mixer 25 to produce intermediate frequency signals. These IF signals then are amplified in an IF amplifier 28 and are detected in a detector stage 29, which supplies the signals to an audio amplifier 30, which in turn drives a speaker 31.

An automatic gain control signal is obtained from the detector 29 in a conventional manner and is applied over a lead 33 to an AGC circuit 34, the output of which is applied to the base of a PNP transistor 60, the collector of which is connected through an isolating capacitor 59 to the base of the RF amplifier transistor 12, and the emitter of which is connected to ground. The AGC voltage applied to the base of the transistor 60 varies its conductivity thereby varying the AC resistance in the circuit between the emitter of the RF amplifier transistor 12 and ground. In order to provide DC operating potential for the variable resistance transistor 60, a resistor 64 is connected between he source of positive potential and the collector of the transistor 60 at the junction of the collector and the capacitor 59.

The DC operating level for the RF amplifier transistor 12 is obtained from a source of positive potential through a voltage divider consisting of a pair of resistors 61 and 62 connected between the source of positive potential and ground. The junction of the resistors 61 and 62 is connected directly to the base of the transistor 12 and is isolated form the collector of the variable impedance transistor 60 by the isolating capacitor 59. Thus, a predetermined DC operating level is established for the RF amplifier transistor 12 by the voltage divider 61, 62 which is isolated from variations in the DC operating level of the transistor 60 by the capacitor 59. At the same time the capacitor 59 permits the passage of AC signals so that the collector-emitter path of the transistor 60 is in series with the emitter-base path or input circuit of the transistor 12 for AC signals.

The coupling circuit between the high impedance capacitive antenna 9 and the relatively low impedance emitter-base path of the transistor 12 includes a series-tuned L-C circuit in the form of an inductor 40 and another voltage-variable capacitor 41. The output of the potentiometer 20 is applied through a third isolating resistor 42 to the junction of the voltage-variable capacitor 41 and a blocking capacitor 44. The capacitance of the capacitor 44 is chosen to be much greater than the capacitance of the other capacitors in the circuit so that it has little affect on the AC signals present in the circuit, while serving to block any DC signals obtained from the potentiometer 20.

When the radio receiver shown in FIG. 1 is used in an automobile, the antenna is a capacitive whip antenna, represented as a voltage generator and the capacitor 48 shown connected in series with the capacitor 44 and the voltage-variable capacitor 41. In addition to these capacitances, additional capacitance to ground exists, due primarily to the cable which connects the whip antenna to the radio receiver; and this capacitance is in the form of a shunt capacitance represented by a capacitor 49 connected between ground and the junction of the capacitors 44 and 48. In order to adjust the radio receiver system shown in FIG. 1 to cover the AM band of frequencies normally received by such a receiver, an additional shunt capacitance 50 also may be provided across the antenna output and is shown as also being connected between ground and the junction of the capacitors 44 and 48. The value of the capacitance 50, when added to the capacitances of the capacitors 48 and 49 forming a parallel combination in series with the capacitor 41, should provide the desired capacitance ratio needed to tune the AM band.

In order to provide a DC return path for the tuning voltage used to tune the voltage variable capacitor 41, a high impedance resistor 52 is connected between ground and the junction of the capacitor 41 and the inductor 40. The resistance of the resistor 52 is chosen to be very high, so that it appears essentially as an open circuit to any AC signals present in the circuit. To prevent the variable tuning voltage applied to the voltage-variable capacitor 41 from adversely affecting the operating level of the transistor 12, a second DC blocking capacitor 53 is provided between the inductor 40 and the emitter of the transistor 12. Like the capacitor 44, the blocking capacitor 53 is also chosen to have a capacitance substantially in excess of the other capacitors in the circuit so as to have substantially no affect on the AC signals present.

With this circuit, it is possible to tune the coupling circuit consisting of the inductor 40 and the voltage-variable capacitor 41 over a relatively wide range of resonant frequencies, while maintaining the bandwidth of the signal constant over the entire range with constant power being coupled to the RF amplifier transistor 12. It has been found that when a hyper-abrupt diode is employed for the capacitor diode 41, a frequency range of 435 kHz. to 1620 kHz. may be tuned with a 10 kHz. bandwidth constant over the entire range.

When strong or high level AC signals are applied across a voltage-variable capacitor diode such as the diode 41, there is a tendency for the diode to rectify or partially rectify the AC signals appearing thereacross. Such rectification of these AC signals then results in a degradation in the operation of the circuit using the voltage-variable capacitor diode caused by a shift in the capacitance of the capacitor diode due to the rectified DC which is present in addition to the normal DC biasing potential.

In order to provide compensation for AC overloads resulting from strong signal levels being obtained form the antenna 9, the emitter-base path of the RF amplifier transistor 12 and the collector-emitter path of the variable resistor transistor 60 are connected in series with the antenna tuning circuit including the diode 41. This circuit path through these junctions of the transistors 12 and 60 constitutes the input resistance as seen by the input AC signal applied to the RF amplifier stage 11. It is apparent that if this input resistance is increased with increasing signal levels, an increased portion of the AC RF signals present in the series circuit including the antenna 9, the coupling circuit 10 and the input of the RF amplifier stage 11, will be dropped across this input resistance, thereby limiting the level of the AC voltages present across the voltage-variable capacitor diode 41. By properly choosing the amount of resistance in series with the diode 41, it is possible to control the circuit so that the AC signals appearing across the capacitor diode 41 never reach a level at which the diode 41 is driven into a rectifying mode of operation. In effect, the collector-emitter path of the transistor 60 operates in the base circuit of the transistor 12 as a variable resistance, and this variable resistance, added to the resistance of the emitter-base path of the transistor 12, constitutes the input resistance for the AC signals.

Figure 3:
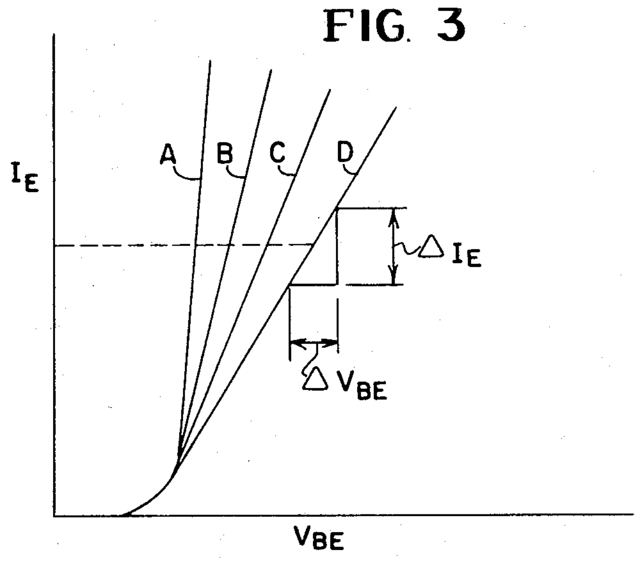
FIGS. 3 and 4 illustrate characteristic curves useful in explaining the operation of the circuits shown in FIGS. 1 and 2.

Referring now to FIG. 3, there are shown four curves, A, B, C, and D plotting the emitter current $I_e$ against the emitter-base voltage of a common-base transistor amplifier with its small signal input resistance controlled by a base resistor. The input resistance $R_i$ for the input AC signals is the small signal resistance $\Delta V_{eb}/\Delta I_e$), and for any given emitter current Ithis input AC signal resistance can be varied by varying the value of the resistance connected in series with the base of the transistor. The results of varying this base resistance of a typical transistor, are shown in curves A, B, C and D. The value of this series base resistance is zero for curve A, 1 K-ohm for curve B, 10 k-ohms for curve C, and 27 k-ohms for curve D, resulting in input resistances $R_i$ of 10, 20, 110 and 300 ohms, respectively. It should be noted in FIG. 3 that all of the curves A, B, C, and D are linear in the operating range of $I_e$ which normally would be encountered, providing a wide dynamic range of signal level as the resistance in series with the base of the transistor is varied. It has been found that the input resistance $R_i$ is approximately equal to (R/B) where R is the added resistance in series with the base of the transistor.

Figure 4:
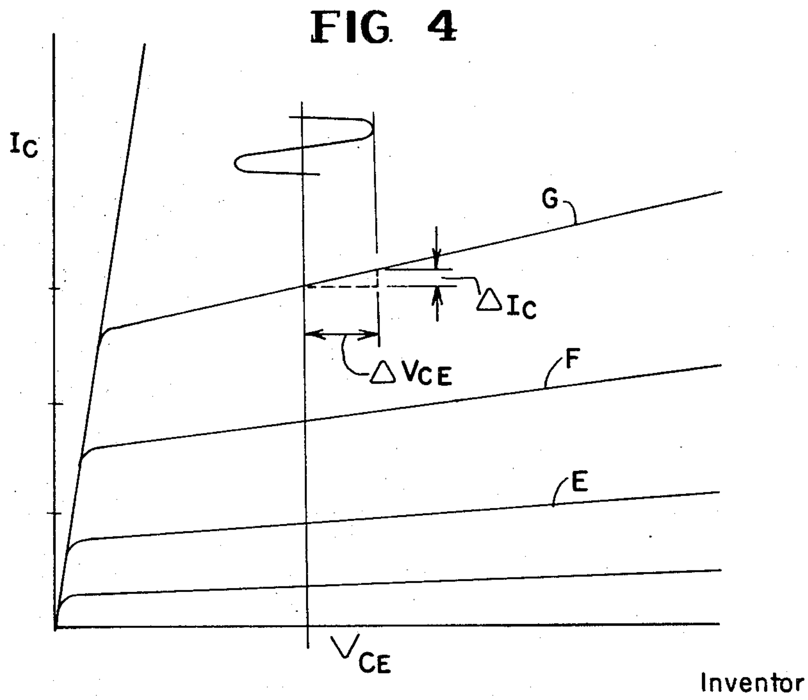

FIG. 4 shows curves E, F, and G resulting from a plot of $V_{ce}$ vs $I_c$ of a transistor at several base bias currents, showing how the slope of $V_{ce}$ vs $I_c$ varies in accordance with different biases applied to the base of the transistor. The effective resistance of a transistor at small signal levels is the slope of these curves ($\Delta V_{ce}/\Delta I_c$) at the collector voltage and current set by the bias applied to the base of the transistor. This effective resistance is proportional to $I_c$ and is generally 6 to 10 times greater than the ratio of ($V_{ce}/I_c$) for DC signal levels.

Thus, by utilizing the transistor 60 as a variable resistance in the base circuit of the transistor 12, the input impedance to AC signals can be varied to cause differing amounts of voltage drop to occur across this input impedance. By the provision of the isolating capacitor 59, The DC operating level of the transistor 12 is unaltered by changes in the DC operating characteristics of the transistor 60, so that the gain of the transistor 12 is unaltered.

AGC control, however, is effected by the operation of the transistor 60 since, as the amplified signal level obtained form the collector of the transistor 12 is processed by the stages 25, 28 and 29 of the receiver, a more positive AGC voltage for increasing signal levels is applied by the AGC circuit 34 to the base of the PNP transistor 60 rendering the impedance less conductive. Thus, the transistor 60 may be operating on curve E of FIG. 4. The small signal AC input resistance ($\Delta V_{ce}/\Delta I_c$), obtained from curve E of FIG. 4 is relatively high. As a consequence, the AC resistance between the emitter of the transistor 12 and ground is increased causing an increaseed voltage drop to occur across this resistance, thereby attenuating the AC signal to provide automatic gain control; and at the same time, reducing the AC signal level across the voltage-variable diode 41 to prevent it from being operated in a rectifying mode. When the AC signals applied by the antenna 9 to the remainder of the circuit drop in level, the AGC voltage becomes more negative, with the result that the transistor 60 becomes more conductive, presenting a reduced AC input impedance to the circuit since it operates on a curve having a steeper slope, such as curve G of FIG. 4. This also causes an increased amount of the signal to be available at the amplified output of the RF amplifier stage 11 obtained from the collector of the transistor 12. Thus, automatic gain control is effected by varying the impedance in series with the input circuit of the RF signals applied to the amplifier transistor 12, while at the same time the DC operating level of the transistor 12 remains unchanged providing for operation of the transistors in the circuit in the desired linear regions thereof.

Figure 2:
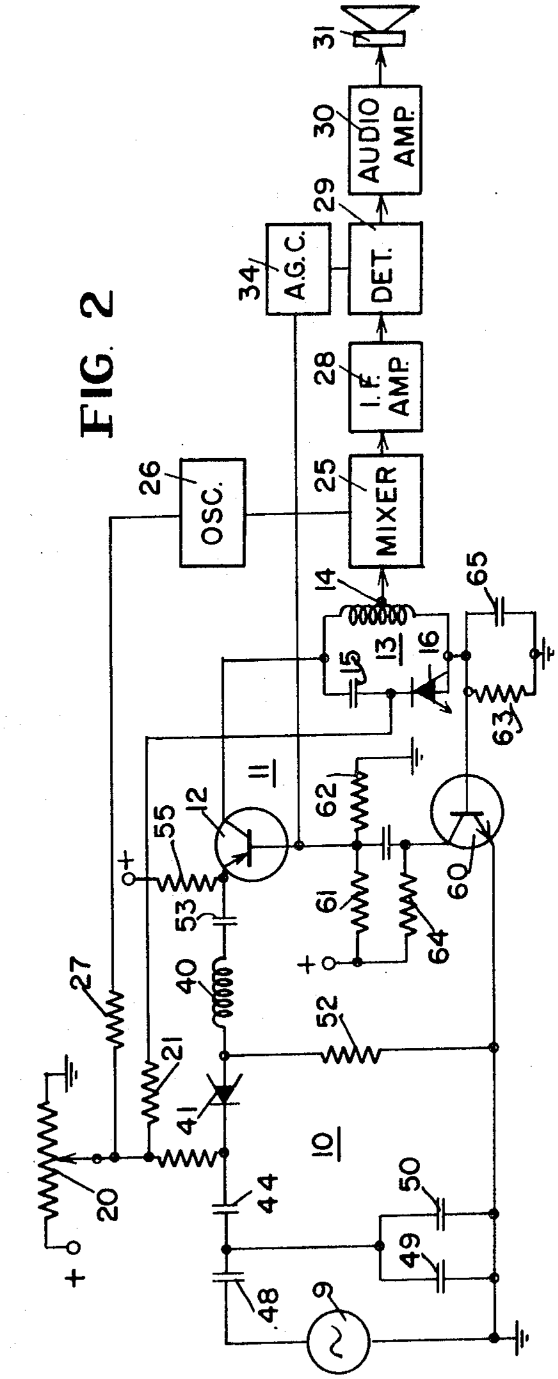
FIG. 2 is a schematic wiring diagram, partially in block form, illustrating another embodiment of the invention.

Referring now to FIG. 2, there is shown another embodiment of the overlaod compensation circuit. The circuit shown in FIG. 2 is, for the most part, the same as the circuit shown in FIG. 1 so that a description of the operation of the circuit will not be given except for the changes which have been made in FIG. 2 over the circuit shown in FIG. 1. These changes are in the manner in which the AGC voltage is applied to the circuit. In the embodiment shown in FIG. 2 the base of the transistor 12 continues to be coupled through the capacitor 59 and the collector-emitter path of a variable resistance transistor 60′ to ground. The transistor 60′ is an NPN transistor, but operates in the same manner as the PNP transistor of FIG. 1.

AGC voltage signals obtained from the AGC circuit 34 are applied to the base of the transistor 12 to vary its operating bias and to increase its emitter-base resistance for increasing AGC voltages. The signals appearing on the collector of the transistor 12 then are applied to the tuned circuit 13, in the same manner as described previously, with the signals from a tap on the inductor 14 of the tuned circuit 13 being utilized as one input to the mixer circuit 25. The tuned circuit 13, however, is connected to ground through an R-C circuit including a resistor 63 and a capacitor 65, with the R-C circuit providing a DC level signal which corresponds to the amplified AGC signal level present on the collector of the transistor 12. This DC signal level obtained from the junction of the resistor 63 and the tuned circuit 13 is applied to the base of the transistor 60 to control its conductivity. When an increased AGC potential is applied to the base of the transistor 12, decreasing its conductivity, the collector voltage of the transistor 12 also is reduced, which in turn causes a reduced voltage to appear across the resistor 63. This reduced voltage applied to the base of the transistor 60 causes a reduction in its conductivity which results in an increase in the impedance presented to the input AC signals applied across the emitter of the transistor 12 and ground. This causes a corresponding drop in the RF signal level across the tuned antenna circuit 10; so that the RF signals across the voltage-variable capacitor 41 are at a reduced level, even though the total RF signal level from the antenna 9 is increased.

The operation of the transistor 60, obtaining an amplified AGC control signal from the collector of the RF transistor 12, provides a regenerative effect and adds to the compensation provided by the AGC control of the transistor 12. In all other respects the operation of the circuit of FIG. 2 is the same as that of FIG. 1.

The AGC voltage performs a dual function in the circuits shown in FIGS. 1 and 2, namely, controlling the gain of the RF amplifier and, in addition, providing an increased series impedance to the RF signals for increasing signal levels. As a result, the RF signals applied across the voltage-variable capacitor diode 41 from the antenna 9 are held below the level at which the diode 41 would rectify the signals.

I claim:

1. In a wave signal receiving apparatus having an antenna, an RF amplifier stage, and an antenna tuning circuit means electrically coupling the antenna and the RF amplifier stage, the tuning circuit means including voltage-variable reactance means and circuit means connected to the voltage-variable reactance means for applying a variable bias potential thereto to selectively tune the antenna tuning circuit means, an overload compensation circuit for the voltage-variable reactance means including in combination:

connecting means for connecting the voltage-variable reactance means of the antenna tuning circuit means in a series circuit between the antenna and the input of the RF amplifier stage;

a variable resistive impedance connected in a series relationship for AC signals with the input circuit of the RF amplifier stage;

control circuit means responsive to the output of the RF amplifier stage for deriving a control voltage corresponding to the magnitude of the signal output obtained from the RF amplifier stage; and means responsive to the control voltage for varying the impedance of the variable impedance in response to variations in the magnitude of the signals obtained form the output of the RF amplifier stage.

2. The combination according to claim 1 wherein the RF amplifier stage includes a transistor having emitter, base, and collector electrodes, with the emitter-base electrodes being connected in a series circuit with the voltage-variable reactance means and the antenna, and with the variable impedance being connected in series circuit with the emitter-base electrodes of the transistor, said combination further including means for applying a DC operating potential to the base of the transistor, and means for maintaining the DC operating level of the transistor established by said DC potential unchanged with changes in the impedance of the variable impedance.

3. The combination according to claim 2 wherein the voltage-variable reactance means is a voltage-variable capacitor.

4. The combination according to claim 3 wherein the voltage-variable capacitor is a varactor diode.

5. The combination according to claim 2 wherein the variable resistive impedance includes the collector-emitter path of a second transistor connected in circuit between a point of reference potential and the base of the RF amplifier transistor, and wherein the control voltage is applied to the base of the second transistor to vary the conductivity thereof, thereby varying the impedance of the collector-emitter path thereof, the emitter-base path of the RF amplifier transistor and the collector-emitter path of the second transistor being in series with the wave signals applied from the antenna across the voltage-variable reactance means.

6. The combination according to claim 5 wherein the control circuit means is an automatic gain control circuit and provides an automatic gain control voltage to the base of the second transistor to reduce the forward bias on the second transistor for increased levels of outputs from the RF amplifier transistor, thereby increasing the impedance of the collector-emitter path of the second transistor to reduce the voltage drop across the voltage-variable reactance means by causing an increased voltage drop to occur across the collector-emitter path of the second transistor.

7. The combination according to claim 5 wherein the DC operating level maintaining comprises a coupling capacitor, the base of the RF amplifier transistor is connected to the collector-emitter path of the second transistor through the coupling capacitor, and the DC operating potential for the base of the RF amplifier transistor is coupled to the junction between the base of the RF amplifier transistor and the capacitor, the capacitor providing DC isolation between the RF amplifier transistor and the second transistor, while permitting passage of AC signals through the path including the emitter-base path of the RF amplifier transistor and the collector-emitter path of the second transistor.

8. The combination according to claim 2 wherein the variable impedance includes the collector-emitter path of a second transistor connected in a series circuit between a point of reference potential and the base of the RF amplifier transistor, and wherein the control circuit means is an automatic gain control circuit which provides an automatic gain control voltage to the base of the RF amplifier transistor to vary the DC operating level thereof, said combination further including means connected to the collector of the RF amplifier transistor for deriving a DC biasing voltage therefrom, and means for applying said DC biasing voltage to the base of the second transistor to vary the conductivity thereof, thereby varying the impedance of the collector-emitter path thereof, the emitter-base path of the RF amplifier transistor and the collector-emitter path of the second transistor being in series with the wave signals applied from the antenna across the voltage-variable reactance means.

9. The combination according to claim 8 wherein the automatic gain control voltage applied to the base of the RF amplifier transistor reduces the forward bias on the RF amplifier transistor for increased levels of outputs from the RF amplifier transistor, thereby decreasing the DC biasing voltage obtained from the collector thereof, said decreased DC biasing voltage applied to the base of the second transistor operating to reduce the conductivity of the second transistor thereby increasing the impedance of the collector-emitter path thereof.

10. The combination according to claim 9 wherein the RF amplifier transistor and the second transistor are of opposite conductivity types.

* * * * *